(12) United States Patent
Rodriguez Ramos et al.

(10) Patent No.: US 8,471,897 B2
(45) Date of Patent: Jun. 25, 2013

(54) METHOD AND CAMERA FOR THE REAL-TIME ACQUISITION OF VISUAL INFORMATION FROM THREE-DIMENSIONAL SCENES

(75) Inventors: José Manuel Rodriguez Ramos, La Laguna (ES); José Gil Marichal Hernández, La Laguna (ES); Fernando Rosa González, La Laguna (ES); Fernando Pérez Nava, La Laguna (ES)

(73) Assignee: Universidad de la Laguna, La Laguna (Tenerife) (ES)

( * ) Notice: Subject to any disclaimer, the term of this patent is extended or adjusted under 35 U.S.C. 154(b) by 417 days.

(21) Appl. No.: 12/812,957

(22) PCT Filed: Jan. 15, 2009

(86) PCT No.: PCT/ES2009/000031
§ 371 (c)(1),
(2), (4) Date: Oct. 28, 2010

(87) PCT Pub. No.: WO2009/090291
PCT Pub. Date: Jul. 23, 2009

(65) Prior Publication Data
US 2011/0032337 A1 Feb. 10, 2011

(30) Foreign Application Priority Data

Jan. 15, 2008 (ES) .................................. 200800126

(51) Int. Cl.
*H04N 13/04* (2006.01)
*H04N 9/083* (2006.01)
(52) U.S. Cl.
USPC ............................................ 348/49; 348/291

(58) Field of Classification Search
USPC ............................................................ 348/48
See application file for complete search history.

(56) References Cited

PUBLICATIONS

Ren Ng, Marc Levoy, etc., Light Field Photography with a Hand-held Plenoptic Camera, Apr. 2005, Standford Tech Report CTSR 2005-02.*
Adelson, Edward H., et al., Single Lens Stereo with a Plenoptic Camera, IEEE Transactions on Pattern Analysis and Machine Intelligence, Feb. 1992, pp. 99-106, vol. 14, No. 2.
Brady, Martin L., et al., Fast Parallel Discrete Approximation Algorithms for the Radon Transform, SPAA, 1992, pp. 91-99, ACM.
Brady, Martin L., A Fast Discrete Approximation Algorithm for the Radon Transform, Siam. J. Comput., Feb. 1998, pp. 107-117, vol. 27, No. 1, Society for Industrial and Applied Mathematics.

(Continued)

*Primary Examiner* — Czekaj David
*Assistant Examiner* — Nam Pham
(74) *Attorney, Agent, or Firm* — Tristan A. Fuierer; Andrew D. Gerschutz; Moore & Van Allen, PLLC (57) ABSTRACT

The invention relates to a method for calculating the focal stack associated with an object space from the plenoptic function thereof, using a sum transform along the length of constrained planes in discrete hypercubes, which allows the computing time to be considerably reduced. The invention also relates to a method for increasing the resolution of the focal stack obtained. In addition, the invention relates to two methods for the real-time recovery of the depths and moduli and phases of the complex amplitude of the wavefront respectively in each position of the surfaces of a three-dimensional scene and to a system adapted for carrying out the aforementioned methods.

10 Claims, 3 Drawing Sheets

PUBLICATIONS

Brandt, A., et al., Fast Calculation of Multiple Line Integrals, Siam. J. Sci. Comput., 1999, pp. 1417-1429, vol. 20, No. 4.

Götz, W.A., et al., A Fast Digital Radon Transform—An Efficient Means for Evaluating the Hough Transform, Pattern Recognition, 1995, pp. 1985-1992, vol. 28, No. 12.

Ng, Ren, et al., Light Field Photography with a Hand-held Plenoptic Camera, Stanford Tech Report CTSR, 2005, pp. 1-11.

Wu, Tung-Kuang, et al., A Fast Approximation Algorithm for 3D Image Reconstruction, 1998 International Computer Symposium Workshop on Image Processing and Character Recognition, Dec. 17-19, 1998, pp. 213-220, N.C.K.U., Tainan, Taiwan, R.O.C.

* cited by examiner

METHOD AND CAMERA FOR THE REAL-TIME ACQUISITION OF VISUAL INFORMATION FROM THREE-DIMENSIONAL SCENES

CROSS-REFERENCE TO RELATED APPLICATIONS

This application is filed under the provisions of 35 U.S.C. §371 and claims the priority of International Patent Application No. PCT/ES2008/000031 filed on 15 Jan. 2009 entitled "Method and Camera for the Real-Time Acquisition of Visual Information from Three-Dimensional Scenes" in the name of José Manuel Rodríguez Ramos, et al., which claims priority of Spanish Patent Application No. P200800126 filed on 15 Jan. 2008, both of which are hereby incorporated by reference herein in their entirety.

OBJECT OF THE INVENTION

The present invention relates to a method for calculating the focal stack associated with an object volume, to a method for improving the resolution of the images of the focal stack obtained, to a method for the real-time measurement of distances in three-dimensional scenes and to a method for the real-time tomographic measurement of the complex amplitude of the electromagnetic field associated with a wavefront.

The present invention allows knowing the distance and the complex amplitude of the electromagnetic field in the positions of the surfaces of the scene.

In addition, the invention relates to a camera for the real-time acquisition of the visual information of three-dimensional scenes in a wide range of volumes, characterized by the use of an objective lens and a lenslet array located in the image space of the objective lens, a sensor placed in the focal point of the lenslets (which collects the image formed by the latter) and parallel computation processing means adapted for calculating the focal stack associated with the object volume measured by the camera, and for calculating with regard to the latter the complex amplitude of the electromagnetic field (modulus and phase) and the three-dimensional position of the radiant surfaces at any point of the sensed object space.

This invention can be useful in any area or application in which it is required to know the wavefront: terrestrial astronomic observation, opthalmology, holography, etc., as well as in which metrology is required: real scenes, 3D television, polishing CCDs, automobile mechanics, etc.

FIELD OF THE ART

Optics. Image processing.

BACKGROUND OF THE INVENTION

The present invention relates both to the need to achieve a three-dimensional measurement of the complex amplitude of the wavefront associated with any optical problem in which image quality is essential (e.g. for diagnosing), and to the need to obtain a sufficiently reliable and precise depth map in a wide range of volumes, from a few microns up to several kilometers, and also to the real-time generation of three-dimensional information for 3D television, 3D movies, medicine, etc.

STATE OF THE ART

The adaptive optics for current telescopes with a large diameter (GRANTECAN, Keck, . . . ) and future giant telescopes (50 or 100 meters in diameter) focuses on measuring the three-dimensional distribution of the atmospheric phase using a form of tomography called multi-conjugate optics. The absence in the sky of a sufficient number of natural point sources, such that there is always one present in the field of vision of the object observed by the telescope, forces using artificial point sources: Na stars (90 km in height).

In order to correct, preventing the focal anisoplanatism, the entire atmosphere affecting the light beam coming from the object in the sky, it is necessary to use several of these artificial stars (at least 5). In order to be generated, each of them needs a very high resolution high-powered pulse laser, which translates into a very expensive technology. In addition, after such a high cost, the multi-conjugate optics is only capable of measuring the atmospheric phase associated with, at most, three horizontal layers of turbulence (with three simultaneously measuring phase sensors), i.e., it scans a very small proportion of the three-dimensional cylinder affecting the image. Furthermore, an estimation of the phase is recovered with such complicated calculations which seriously complicate the adaptive correction of the optic beam within the time of stability of the atmosphere in the visible range (10 ms).

However, the background of the invention is not exclusively focused on the field of astrophysics. In the sector of optics, or opthalmology, the main interest in performing the tomography of the human eye is based on medical specialists obtaining and having a clear image of the retinal fundus of the patient, in order to be able to more readily perform diagnostics. The aqueous humor, the vitreous humor and the crystalline lens in the eye behave like means which aberrate the image that can be obtained of the retinal fundus.

Even though for this case it is not necessary to take measurements as frequently as in the terrestrial atmosphere (every 10 ms), since it is a stable deformation, sufficient three-dimensional resolution is required to not only obtain a good image of retinal fundus, but to also detect the spatial location of possible ocular lesions.

Finally, and in another sector such as that of television or cinematographic images, there are challenges relating to three-dimensional television, in which one of the essential problems is the real-time generation of contents, given that the techniques are so complex and laborious that they need human intervention during the process for the generation of 3D contents which can be shown on existing 3D displays. In this sense, the optimized implementation on parallel computing hardware (GPUs and FPGAs) of the techniques herein proposed allows generating real-time three-dimensional contents.

Approaches are known in the state of the art in the mentioned fields in which lenslets have been placed in the image plane of a converging lens, giving rise to devices and methods for the measurement of image parameters, nevertheless, they do not use said assembly for taking the tomographic measurement of the optical aberration, or for obtaining distances in the scene.

For example, Adelson and Wang ("Single lens stereo with a plenoptic camera", IEEE Transactions on Pattern Analysis and Machine Intelligence, Vol. 14, No. 2, 99-106, 1992) use the device to obtain distances with a technique that is completely different from that of the present invention.

The authors Ren Ng et al. ("Light field photography with a hand-held plenoptic camera", Stanford Tech Report CTSR 2005-02) use the Fourier Slice technique associated with lenslets in the image plane only for obtaining focused photographs of real scenes in ranges of a few cubic meters of volume, with quality apparently better than the typical field depth technique. In this case, the proposed technique allows calculating the focal stack if it is applied repeatedly for the distances covering the required volume, involving computational requirements which would make real-time processing impossible.

Throughout the present specification, focal stack of a scene will be interpreted as the image volume that would result from taking a group of conventional photographic images, from the same point of view, but varying the focusing distance.

In relation to the processes of information extraction, it is known that obtaining a photographic image from the light-field or four-dimensional plenoptic function, $f(u,v,x,y)$, is possible by integrating all the rays reaching each point $(x, y)$ of the sensor, coming from each point $(u, v)$ of the plane of the lens. By means of said integration the plenoptic capture effect is undone. In other words, if the rays have been redirected to different spatial positions when captured with the lenslets, in order to redo the conventional image it is necessary to regroup, i.e., again integrate in common for a position $(x, y)$ what came from different angular values $(u, v)$.

The image obtained by the operator $E_F(x,y)=\iint f(u,v,x,y) du\, dv$, or photographic formation integral, reimages the photographic image that would have been obtained with a conventional sensor focused on the plane at a distance F, conjugated with respect to the objective lens of the lenslets-sensor assembly. If it is desired to reimage in a plane at a distance $F'=\alpha \cdot x$, prior to or after F, Ren Ng demonstrates, by the similarity of triangles, that the following must be evaluated:

$$E_{\alpha \cdot F}(x, y) = \int \int f\left(u, v, u \cdot \left(1 - \frac{1}{\alpha}\right) + \frac{x}{\alpha}, v \cdot \left(1 - \frac{1}{\alpha}\right) + \frac{y}{\alpha}\right) du\, dv.$$

The evaluation of this operator for each possible distance $\alpha \cdot F$ requires $O(N^4)$ operations and, therefore, for N planes would require $O(N^5)$ operations, where N is the resolution with which each of the dimensions of the plenoptic function is sampled.

Ren Ng also demonstrates that if 4D Fourier transform of the light-field is calculated, which involves $O(N^4 \log_2 N)$ complex summation and multiplication operations, the different refocusing planes can be obtained by performing a truncated 2D rotation and 2D anti-Fourier transform of the 4D transform function of the light-field, each of them with a computational complexity of $O(N^2)+O(N^2 \log_2 N)$ to be added to the initial cost of the Fourier transform of the sensed 4D function.

A method is therefore necessary which allows reducing the computational cost of the calculation of the focal stack and, accordingly, its calculation time.

The most closely related background document of the method for calculating the focal stack of the present invention is the discrete fast (or approximate, according to the author) Radon transform proposed by Götz and Druckmüller ("*A fast digital Radon transform—an efficient means for evaluating the Hough transform*". Pattern Recognition, vol. 29, no. 4, pp. 711-718, 1996.), and Brady ("*A Fast Discrete Approximation Algorithm for the Radon Transform*". SIAM J. Comput., vol. 27, no. 1, pp. 107-119, 1998) independently, which simultaneously evaluates the summation of the values along the length of a series of discrete lines, each one characterized by a slope and a displacement with respect to the origin, arranged on a two-dimensional data grid, by means of $O(N^2 \log_2 N)$ sums in which the direct evaluation of the summation on each line would require $O(N)$ operations, and therefore, the evaluation for N slopes and N displacements would require $O(N^3)$ sums.

Finally, disregarding the processes for obtaining the information of the scene and considering the system of the present invention, Richard M. Clare and Richard G. Lane ("*Wavefront sensing from subdivision of the focal plane with a lenslet array*", J. Opt. Soc. Am. A, Vol. 22, No. 1, 117-125, 2005) have proposed a system in which a lenslet array is placed right in the focus of the converging lens, not in any position of the image plane, and by means of which the phase of the wavefront is obtained only in the pupil of the lens.

Therefore, a method is necessary which allows determining the phase of the wavefront topographically, i.e., at any distance within the three-dimensional volume of the object space, not only in the pupil of the lens.

DESCRIPTION OF THE INVENTION

The present invention solves the previously described drawback by providing in a first aspect a method for calculating the focal stack associated with a scene according to claim 1, which method allows significantly reducing the computational cost of the process and the calculation time, which involves a considerable improvement with respect to the methods known in the state of the art.

An additional object of the present invention is to propose a method for measuring distances in scenes and a method for measuring the complex amplitude of the electromagnetic field which are computationally optimized and suitable for their parallel computation.

The present invention allows:

Being restricted to a single measurement and to a single sensor, within each time of atmospheric stability.

A recovery of the modulus and phase associated with each turbulent horizontal layer, i.e., tomography of the entire atmosphere by means of the method for calculating the focal stack, that is fast in consideration of the number and type of operations (sums) it uses, but which can be accelerated with an intelligent adaptation thereof to graphic processing units (GPU) or to reconfigurable hardware units, such as FPGAs (Field Programmable Gate Arrays).

Preventing the need to use artificial laser stars, because it is capable of performing the real-time recovery of the image of the object upon its arrival to the terrestrial atmosphere, since this new technique does not require calibration with a point signal for subsequent deconvolution.

The method for calculating the focal stack of the invention, referred to as SCPH (Summation of Constrained Planes in a Hypercube) Transform, allows obtaining a series of planes of a three-dimensional scene, focused in different positions along the length of the optical axis, reducing the computational complexity of the process.

The method for calculating the focal stack of the invention is based on the principles of multiscale methods for the computation of the discrete fast Radon transform, and minimizes the number of operations to be performed by means of reusing partial results.

For the purpose of reducing the computational cost of the calculation of the focal stack, the method of the present invention uses a sum transform along the length of constrained planes in discrete hypercubes. It must be observed that the photographic formation integral is geometrically equivalent to evaluating the integral along the length of planes in a function the domain of which is a 4-dimensional hypercube. With this being understood, the photographic formation integral is a particular case of $E_{r_1,r_2}(j,k)=\iint f(u,v,u\cdot r_1+j,v\cdot r_2+k)\, du\, dv$, adding the restriction that slopes $r_1$ and $r_2$ defining the integration planes are equal for the case at hand, which allows reducing the number of operations to be performed.

The proposed method for calculating the focal stack consists of simultaneously computing the sum of the values positioned in the discrete 4D function, $f(u,v,x,y)$, on planes such that the coordinates of the points located therein simultaneously meet $x=u\cdot r+j$ and $y=v\cdot r+k$, under certain discretization conditions, reusing the partial sums of points contained by more than one discrete plane, where u and v are the horizontal and vertical dimensions on the plane of the lens and x and y are the horizontal and vertical dimensions on the sensor plane, and j, k and r are the horizontal, vertical and depth dimensions of the focal stack that is to be obtained. In other words, the algorithm computing the discrete fast approximate Radon transform, which already existed for the case of line integrals in the plane, is extended until it reaches 4-dimensional hyperplane integrals on the 4-dimensional hypercube, with the added factor that the horizontal and vertical slopes are the same.

The partial transformation of the data, up to step m, is defined as:

$$\tilde{f}^m(r,s,t,j,k) = \tilde{f}^m\left(\underbrace{r_0,\ldots,r_{m-1},s_m,\ldots,s_{m-1},t_m,\ldots,t_{m-1}}_{2n-m\ bits},j,k\right)$$

$$= \sum_{u\in\mathbb{Z}_2^m}\sum_{v\in\mathbb{Z}_2^m} f\left(\underbrace{\lambda(u,s)}_{n},\underbrace{\lambda(v,t)}_{n},l^m_{\lambda(r)}(u)+j,l^m_{\lambda(r)}(v)+k\right)$$

where it is considered that the function has N×N×N×N dimensions, with $n=\log_2 N$, the function $$\iota_s^n(u_0,\ldots,u_{n-1})=\iota_{\lfloor s/2 \rfloor}^{n-1}(u_0,\ldots,u_{n-2})+u_{n-1}\cdot\lfloor(s+1)/2\rfloor$$

describes the discrete manner in which the succession of points $(u, \iota_s^n(u)+d)$, with $u\in[0, N)$, joins points $(0, d)$ and $(N-1, s+d)$ forming a discrete line of slope $s/(N-1)$, and the function $\lambda(u_0,\ldots,u_{n-1})=\Sigma_{i=0}^{n-1}2^i\cdot u_i$ returns the value $\lambda(u)\subset \mathbb{Z}$ corresponding to the binary nuple $u=(u_0,\ldots,u_{n-1})\in\mathbb{Z}_2^n$.

If the transformed data up to step 0, $\tilde{f}^0(r,s,t,j,k)$, are made to be equal to the captured data, $f(s,t,j,k)$:

$$\tilde{f}^0(r,s,t,j,k) = f\left(\frac{s,t}{2n},j,k\right), \text{ then:}$$

$$\tilde{f}^n(r,s,t,j,k) = \tilde{f}\left(\frac{r}{2n},j,k\right)$$

$$= \sum_{u\in\mathbb{Z}_2^n}\sum_{v\in\mathbb{Z}_2^n} f(\lambda(u),\lambda(v),l^n_{\lambda(r)}(u)+j,l^n_{\lambda(r)}(v)+k)$$

which approximates the photographic formation integral $E_r(j, k)=\iiint f(u,v,u\cdot r+j,v\cdot r+k)du\,dv$, for a volume of N depth planes.

Other N depth planes can be similarly computed for negative slopes. Since both half-volumes share depth 0, a total focal stack made up of 2N−1 images refocused at different distances would be obtained.

The recurring formula which maps two partial steps m and m+1, completely describes the method, and must be applied n times:

$$\tilde{f}^{m+1}\left(\underbrace{\underbrace{r_0,\ldots,r_{m-1}}_{r:m\ bits},r_m}_{r:m+1\ bits},\underbrace{s_{m+1},\ldots,s_{n-1}}_{s:n-m-1\ bits},\underbrace{t_{m+1},\ldots,t_{n-1}}_{t:n-m-1\ bits},j,k\right) =$$

$$\tilde{f}^m(\rho,0,s,0,t,j,k)+\tilde{f}^m(\rho,1,s,0,t,j+r_m+\lambda(\rho),k)+$$

$$\tilde{f}^m(\rho,0,s,1,t,j,k+r_m+\lambda(\rho))+$$

$$\tilde{f}^m(\rho,1,s,1,t,j+r_m+\lambda(\rho),k+r_m+\lambda(\rho))$$

It must be observed that the domain for which the partial transformation $\tilde{f}^{m+1}$ is described is half that required by $\tilde{f}^m$, being progressively transformed from a 4D domain into a 3D domain, in a process requiring $O(N^4)$ sums, which translates into a savings in computing time of greater than eighty percent with respect to current processes.

By following this process, and with the methods herein proposed, it is possible to recover depths and moduli and phases of the complex amplitude of the wavefront in each position of the surfaces of the scene, which allows complete three-dimensional and real-time scanning of the scene, therefore being very applicable in the aforementioned fields.

The method for calculating the focal stack of the present invention advantageously does not require multiplications or trigonometric operations, only summations and its computational complexity is of the order of $O(N^4)$ for a final volume containing 2N−1 photographic planes focused at different depths, from a light-field of dimension $N^4$.

The method of the present invention allows computing the focal stack for an entire volume and with a smaller number of operations than what the methods for obtaining the focal stack described in the state of the art (Ren Ng) use for computing a single plane.

Nevertheless, a problem which arises in capturing the 4D light-field is the need to use a 2-dimensional sensor. For obtaining the entire 4D volume of information on a 2D sensor, a sensor with a very high resolution is necessary. Thus, for a sensor of $O(N^4)$ pixels, it is only possible to obtain a focal stack made up of images of $O(N^2)$ pixels and therefore only $O(N^2)$ distances. This reduction of resolution of the order of $O(N^2)$ makes it necessary to use very expensive sensors.

To solve this problem, a second aspect of the present invention provides a method for improving the resolution of the images of the focal stack according to claim 2. In said method, it is assumed that the elements of the scene have Lambertian-type reflectance, i.e., the intensity emitted by a point in the object is independent of the angle. In this case, the light-field has redundant information of the order of $O(aN^2)$, where a is an arbitrary constant with $0<a<1$. This redundant information can be used to increase the resolution of the images of the focal stack.

The method according to claim 2 allows going from a focal stack with images with resolution $O(N^2)$ to another with resolution $O((1-a)N^4)$.

Given an image of the focal stack corresponding to a plane at a determined distance, the method of increasing resolution of the focal stack comprises:

1. Back-projecting the $O(N^4)$ rays of the light-field from that plane constructing an image at a high resolution with the fractional positions of those rays.
2. Determining the redundancies due to the Lambertian assumption.
3. In this image with an increased resolution (with super-resolution) there are two types of pixels: those for which there are no redundancies, where the value of the back-projected ray is placed, and those for which there are redundancies, where a representative value of the redundant rays is placed, such as the mean.

Assuming $O(aN^2)$ redundancies for each of the $O(N^2)$ elements of the image of the original focal stack, the final resolution of the image of the focal stack would be increased from $O(N^2)$ to $O((1-a)N^4)$.

In the context of the present specification, super-resolution is interpreted as any increased definition of both the image and the associated distance map, with respect to the resolution in lenslets, $O(N^2)$. The maximum limit thereof is therefore in the number of pixels $O(N^4)$, a resolution of the order of $O((1-a)N^4)$ being advantageously obtained with the method of the invention.

Typically, the value of a depends on the image of the focal stack being considered. For the calculation of distances, a minimum resolution is fixed and the images are implicitly or explicitly resampled to obtain said minimum resolution.

A third aspect of the invention presents a method for the real-time measurement of distances in three-dimensional scenes according to claim 3. Said method comprises obtaining an image of the object space with a phase camera, calculating the focal stack by means of the method of claim 1, applying a focus quality measurement operator in the focal stack (variance, Laplacian, gradient), and calculating the optimal state on a random Markov field.

The steps of the aforementioned method can be adapted to be implemented on parallel computing hardware, such as a GPU or an FPGA, which results in an even more advantageous optimization of the processing time.

In a fourth aspect, the invention provides a method for the real-time tomographic measurement of the complex amplitude of the electromagnetic field associated with a wavefront of a scene according to claim 5. Said method comprises obtaining an image of the object space with a phase camera, calculating the focal stack by means of the method of claim 1, which provides the tomography of the squared modulus of the complex amplitude of the wavefront, applying an operator for the generation of the gradients of the wavefront phase at any point of the volume of the object space, and recovering the phase of the wavefront of the associated electromagnetic field.

The steps of the aforementioned method can be adapted to be implemented on parallel computing hardware, such as a GPU or an FPGA, which results in an even more advantageous optimization of the processing time.

Both in the method for the real-time measurement of distances in three-dimensional scenes and in the method for the real-time tomographic measurement of the complex amplitude of the electromagnetic field associated with a wavefront, the measurements of the object space are performed only once, i.e., a single image contains enough information for recovering the three-dimensional environment. Such image can be understood as being made up of 4 dimensions: two coordinates on the detector associated with the inside of each lenslet and two other coordinates associated with the lenslet array.

The assembly would consist of a single lenslet array, forming an image on a detecting surface for detecting sufficient resolution (for example a CCD device) which is located in a position of the image space of a converging lens, which allows taking tomographic measurements of the three-dimensional object space.

Finally, a fifth aspect of the present invention provides a phase camera for the real-time acquisition of the visual information of three-dimensional scenes according to claim 7 which comprises a converging lens, a lenslet array placed in a position of the image space of the converging lens and which forms an image on a detecting surface for detecting sufficient resolution, and parallel computation processing means adapted for calculating the focal stack associated with the object space measured by the camera by means of the method of claim 1, for obtaining the complex amplitude of the electromagnetic field (modulus and phase) and for obtaining the distance in any position of the sensed object space.

Compared to the methods and systems of the state of the art, the method for calculating the focal stack according to the present invention allows topographically determining the phase of the wavefront, i.e., at any distance within the three-dimensional volume of the object space. Furthermore, the method for calculating the focal stack of the present invention allows characterizing the electromagnetic field not only by the phase of the wavefront in a plane, but rather by the complex amplitude of the electromagnetic field associated with the wavefront in the entire volume.

DESCRIPTION OF THE DRAWINGS

To complement the description that will be provided below and for the purpose of aiding to better understand the features of the invention, a set of drawings is attached as an integral part of said description in which the following has been depicted with an illustrative and non-limiting character.

DETAILED DESCRIPTION OF A PREFERRED EMBODIMENT OF THE INVENTION

In a first practical embodiment of the invention, the measurement of the distance at which the objects of a scene are located is considered.

The particular case of the observation from this invention of a scene consisting of the inside of a furnished room is considered, where several objects located at depths ranging from 0.5 up to 4 meters from the position of the camera can be distinguished as components.

Figure 1:
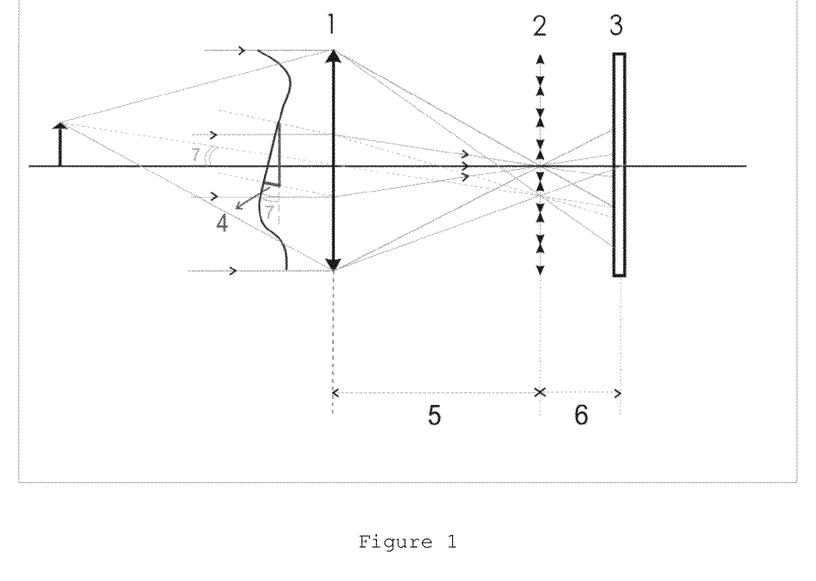
FIG. 1 shows a schematic depiction of the main elements of the camera for the real-time acquisition of the visual information of three-dimensional scenes according to the invention.

FIG. 1 schematically depicts the arrangement of an aperture lens (1), a lenslet array (2) and a detecting surface (3) included in the phase camera according to the invention. Furthermore, the distance (5) from the converging lens to the one focusing on a determined object of the object space, the focal point (6) of each lenslet of the lenslet array, the local angle of inclination of the wavefront (7) and the displacement in the optical path (4) experienced by turbulent wavefront with respect to another one that is not aberrated are shown. The camera of the invention also comprises processing means not depicted in the drawing.

To form the camera of the invention for the real-time acquisition of the visual information of three-dimensional scenes, a CCD sensor with a maximum resolution of 4000×2672, Imperx IPX-11M5 model, is used. Following the assembly of FIG. 1, placed before the CCD there is an objective lens with the same focal ratio as the subsequent lenslet array (16×16 and in an F-Nikon mount) focused on the CCD covering 1024×1024 pixels. The camera in this arrangement has a horizontal angular aperture of 30°, and is focused on the central region of the scene, at approximately 2 meters.

The detected image is treated with processing means, in this example a GPU nVidia 8800 GTX graphics card adapted for:
  calculating the focal stack by means of the method for calculating the focal stack of the invention, adapted to be optimally implemented on parallel computing hardware;
  applying a focus quality measurement operator in the focal stack, for example, the operator "Variance" for estimating the quality of the focus, optimally adapted for the same parallel computing hardware; and
  recovering the distances by means of calculating the optimal state on a random Markov field, for example, propagation of the belief based on the re-weighting of Kolmogorov trees, implemented in an optimized manner on parallel computing hardware.

The depth map of the scene is obtained with the camera and the method of the invention.

In a second practical embodiment of the invention the measurement of the complex amplitude of the electromagnetic field is considered.

The particular case of an astrophysical observation with a telescope having a diameter greater than the coherence diameter $r_0$ of the atmosphere (approximately 20 cm in the visible range) is considered. The turbulence of the atmosphere causes a loss of resolution in the image obtained with the telescope, i.e., loss of the information of high spatial frequencies. To prevent this, the manner in which the atmospheric turbulence degrades the wavefront of the light coming from the star under study must be known. To that end, natural or artificial point stars which allow characterizing the deformation introduced by the atmosphere in the wavefront can be used as a reference.

Figure 3:
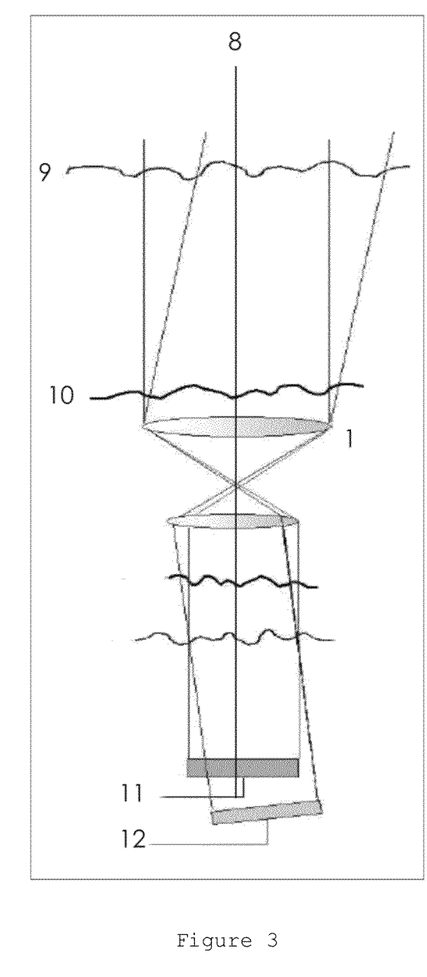
FIG. 3 shows a conceptual diagram of a classic astrophysical observation of a star (8) using multiconjugate adaptive optics in two layers of turbulence in the atmosphere (9) and (10).

FIG. 3 schematically depicts an astrophysical observation of a star (8) using classic multiconjugate adaptive optics in two layers of turbulence in the atmosphere. With multiconjugate adaptive optics, a wavefront phase sensor must be used by each deformable mirror conjugated to an individual layer of turbulence, i.e., two different phase sensors (WFS) which must be aligned and operated in parallel and in different positions of the optical axis. The figure depicts a telescope (1) and two wavefront sensors (11) and (12) associated in a conjugated manner to each turbulent layer (9) and (10). It is only possible to recover a very small number of individual layers of turbulence (three layers at the most) with classic multiconjugate adaptive optics. The complexity of the calculations and the need for speed, since the atmosphere changes every 10 milliseconds in the visible range, currently makes it impossible to overcome the correction in only three layers of atmospheric turbulence.

Figure 2:
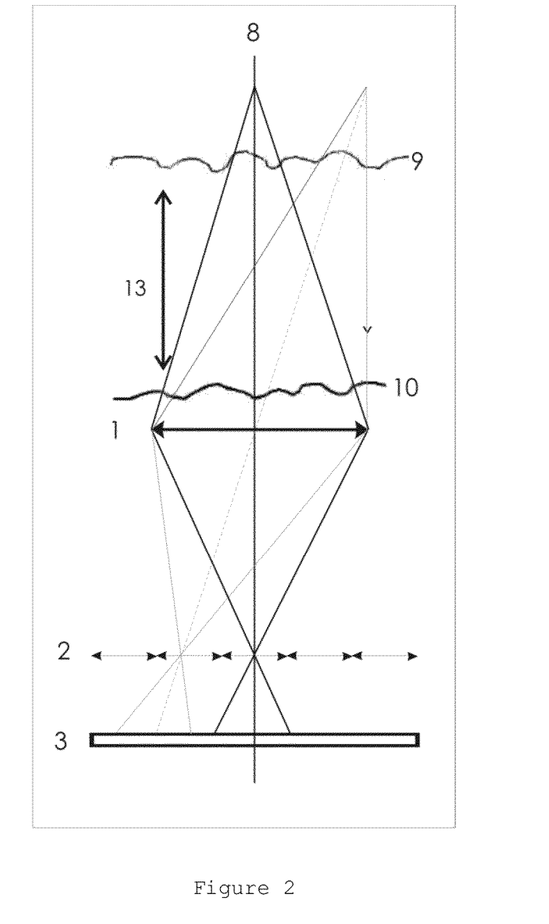
FIG. 2 shows a conceptual diagram of the invention applied to a telescope with a large main mirror (1) for performing the atmospheric tomography in the astrophysical observation of a star (8) with adaptive optics.

With the present invention, according to the design shown in FIG. 1, and the operation of which in this case is shown in FIG. 2, only one sensor is used, placed in a single position of the optical axis.

FIG. 2 schematically shows a system according to the invention for performing atmospheric tomography in the astrophysical observation of a star (8) with adaptive optics. The individual layers of turbulence in the atmosphere correspond to (9) and (10). In this case, the above-described telescope (1) itself functions as the objective lens. A lenslet array (2) (32×32, mount C) focusing on an IXON ANDOR model 512×512 pixel camera (3) is placed in its image space. The phase camera of the invention allows scanning the complete cylinder of atmospheric turbulence (13) affecting the final image of the telescope. The data are collected and treated by means of a Virtex ML501 model FPGA previously adapted for performing by means of the following process:
  calculating the focal stack by means of the method of claim 1, where the square root of the focal stack directly supplies the modulus of the complex amplitude of the electromagnetic field at any point of the volume of the object space,
  applying an operator for the generation of the gradients of the wavefront phase at any point of the volume of the object space (Clarke and Lane operator, for example), and
  recovering the phase of the wavefront of the associated electromagnetic field, for example, by means of the method with an expansion in complex exponentials, the expansion as a function of Zernike polynomials or the Hudgin algorithm.

Unlike previous techniques, in the method of the invention the operator for the generation of the gradients of the wavefront phase is applied locally, rather than to the plenoptic image as a whole.

A single measurement, subsequently processed as described, allows the real-time acquisition of the three-dimensional map of turbulences (complex amplitude of the wavefront) associated with the entire atmospheric column affecting the observation with our telescope and of the height at which these layers of turbulence are located, as well as the distance and three-dimensional profile if an artificial laser star was used.

The invention claimed is:

1. A method for the real-time acquisition of the visual information of three-dimensional scenes comprising:
  (a) measuring an object space by a camera comprising an objective lens, a lenslet array located in the image space of the objective lens and a sensor placed in the focal point of the lenslets, and
  (b) calculating a focal stack associated with the object space measured by the camera from the discrete plenoptic function thereof, $f(s,t,j,k)$,
which comprises evaluating the photographic formation integral, $E_r(j,k) = \iint f(u,v,\cdot r+j,v\cdot r+k)\,du\,dv$, as a sum along the length of planes in a 4D hypercube, u, v being the horizontal and vertical dimensions on the plane of the lens, and j, k, r being the horizontal, vertical and depth dimensions of the focal stack to be obtained, said evaluation of the photographic formation integral in turn comprising the following steps:
  (b1) at the start of the computation, making the captured data, $f(s,t,j,k)$, be equal to the transformed data up to step 0, $$\tilde{f}^0(r, s, t, j, k);$$

and
  (b2) applying $n = \log_2 N$ times the following partial transformation:

$$\tilde{f}^{m+1}\left(\underbrace{\overbrace{r_0, \ldots, r_{m-1}}^{\rho: m\text{ bits}}, r_m, \overbrace{s_{m+1}, \ldots, s_{n-1}}^{s: n-m-1\text{ bits}}, \overbrace{t_{m+1}, \ldots, t_{n-1}}^{t: n-m-1\text{ bits}}}_{r: m+1\text{ bits}}, j, k\right) =$$

$$\tilde{f}^m(\rho, 0, s, 0, t, j, k) + \tilde{f}^m(\rho, 1, s, 0, t, j + r_m + \lambda(\rho), k) +$$

$$\tilde{f}^m(\rho, 0, s, 1, t, j, k + r_m + \lambda(\rho)) +$$

$$\tilde{f}^m(\rho, 1, s, 1, t, j + r_m + \lambda(\rho), k + r_m + \lambda(\rho)),$$

where $p=(r_0, \ldots, r_{m-1})$, $s=(s_{m+1}, \ldots, s_{n-1})$, $t=(t_{m+1}, \ldots, t_{n-1})$, and $$\lambda(u_0, \ldots, u_{n-1}) = \sum_{i=0}^{n-1} 2^i \cdot u_i,$$

until obtaining $$\tilde{f}^n(r, s, t, j, k) = f_{\left(\frac{r}{n}\right)}, j, k),$$

which approximates the photographic formation integral $E_r(j, k)$ for a volume of N depth planes.

2. A method for improving the resolution of the images of the focal stack obtained by means of step b) of the method according to claim 1, which comprises the following steps:
  given an image of the focal stack at a determined distance, back-projecting the $O(N^4)$ rays of the plenoptic function, constructing an image at a high resolution with the fractional positions of these rays,
  determining the redundancies resulting from assuming that the elements of the scene have a Lambertian-type reflectance, and
  in the positions of the focal stack with super-resolution where there are no redundancies, placing the value of the back-projected ray and where there are redundancies, placing a representative value of the redundant rays, such as the mean.

3. A method for the real-time acquisition of the visual information of three-dimensional scenes according to claim 1, applied to the real-time measurement of distances in three-dimensional scenes, which comprises the following additional steps:
  applying a focus quality measurement operator in the calculated focal stack, and calculating the optimal state on a random Markov field.

4. A method for the real-time measurement of distances in three-dimensional scenes which comprises the following steps:
  obtaining an image of the object space with a phase camera,
  calculating the focal stack by means of the method of claim 1,
  applying a focus quality measurement operator in the focal stack,
  calculating the optimal state on a random Markov field, and improving the resolution of the images of the focal stack by means of the method of claim 2.

5. A method for the real-time acquisition of the visual information of three-dimensional scenes according to claim 1, applied to the real-time tomographic measurement of the complex amplitude of the electromagnetic field associated with a wavefront, which comprises the following additional steps:
  obtaining the modulus of the complex amplitude of the electromagnetic field at any point of the volume of the object space from the square root of the calculated focal stack,
  applying an operator for the generation of the gradients of the wavefront phase at any point of the volume of the object space, and
  recovering the phase of the wavefront of the associated electromagnetic field.

6. A method for the real-time tomographic measurement of the complex amplitude of the electromagnetic field associated with a wavefront which comprises the following steps:
  obtaining an image of the object space with a phase camera,
  calculating the focal stack by means of the method of claim 1, where the square root of the focal stack directly supplies the modulus of the complex amplitude of the electromagnetic field at any point of the volume of the object space,
  applying an operator for the generation of the gradients of the wavefront phase at any point of the volume of the object space,
  recovering the phase of the wavefront of the associated electromagnetic field, and improving the resolution of the images of the focal stack by means of the method of claim 2.

7. A phase camera for the real-time acquisition of the visual information of three-dimensional scenes which comprises
  a converging lens,
  a lenslet array placed in a position of the image space of the converging lens and which forms an image on a detecting surface for detecting sufficient resolution, and
  parallel computation processing means adapted for
    calculating the focal stack associated with the object space measured by the camera by means of the step b) of the method of claim 1,
    obtaining the complex amplitude of the electromagnetic field (modulus and phase) and
    obtaining the distance in any position of the sensed object space.

8. A phase camera for the real-time acquisition of the visual information of three-dimensional scenes which comprises
  a converging lens,
  a lenslet array placed in a position of the image space of the converging lens and which forms an image on a detecting surface for detecting sufficient resolution, and
  parallel computation processing means adapted for
    calculating the focal stack associated with the object space measured by the camera by means of the method of claim 1,
    obtaining the complex amplitude of the electromagnetic field (modulus and phase), and
    obtaining the distance in any position of the sensed object space,
  wherein the processing means are adapted for improving the resolution of the images of the focal stack by means of the method of claim 2.

9. A phase camera for the real-time acquisition of the visual information of three-dimensional scenes which comprises
  a converging lens,
  a lenslet array placed in a position of the image space of the converging lens and which forms
  an image on a detecting surface for detecting sufficient resolution, and
  parallel computation processing means adapted for
    calculating the focal stack associated with the object space measured by the camera by means of the method of claim 1,
    obtaining the complex amplitude of the electromagnetic field (modulus and phase), and
    obtaining the distance in any position of the sensed object space,
  wherein the processing means are adapted for obtaining the distance in any position of the object space by means of the method of claim 3.

10. A phase camera for the real-time acquisition of the visual information of three-dimensional scenes which comprises
- a converging lens,
- a lenslet array placed in a position of the image space of the converging lens and which forms
- an image on a detecting surface for detecting sufficient resolution, and
- parallel computation processing means adapted for
  - calculating the focal stack associated with the object space measured by the camera by means of the method of claim 1,
  - obtaining the complex amplitude of the electromagnetic field (modulus and phase), and
  - obtaining the distance in any position of the sensed object space,
- wherein the processing means are adapted for obtaining the complex amplitude of the electromagnetic field by means of the method of claim 5.

* * * * *

UNITED STATES PATENT AND TRADEMARK OFFICE
CERTIFICATE OF CORRECTION

PATENT NO. : 8,471,897 B2  
APPLICATION NO. : 12/812957  
DATED : June 25, 2013  
INVENTOR(S) : Rodriguez Ramos et al.

Page 1 of 1

It is certified that error appears in the above-identified patent and that said Letters Patent is hereby corrected as shown below:

In the Claims:

Column 10, Line 40: change "gral, $E_r$ (j,k)= $\iint f(u,v,\cdot r+j,v\cdot r+k)du\,dv$, as a sum along the" to --gral, $E_r$ (j,k)= $\iint f(u,v,u\cdot r+j,v\cdot r+k)du\,dv$, as a sum along tne--

Signed and Sealed this  
Sixth Day of August, 2013

Teresa Stanek Rea  
*Acting Director of the United States Patent and Trademark Office*